United States Patent
Lloyd et al.

(10) Patent No.: US 11,647,304 B2
(45) Date of Patent: *May 9, 2023

(54) IMAGE SENSORS HAVING DIELECTRIC RELAXATION CORRECTION CIRCUITRY

(71) Applicant: SEMICONDUCTOR COMPONENTS INDUSTRIES, LLC, Phoenix, AZ (US)

(72) Inventors: Denver Lloyd, Boise, ID (US); Manuel H. Innocent, Wezemaal (BE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/659,290

(22) Filed: Apr. 14, 2022

(65) Prior Publication Data
US 2022/0286632 A1 Sep. 8, 2022

Related U.S. Application Data

(63) Continuation of application No. 17/249,430, filed on Mar. 2, 2021, now Pat. No. 11,336,848.

(51) Int. Cl.
*H04N 5/365* (2011.01)
*H04N 25/671* (2023.01)
(Continued)

(52) U.S. Cl.
CPC ......... *H04N 25/671* (2023.01); *H04N 25/445* (2023.01); *H04N 25/72* (2023.01)

(58) Field of Classification Search
CPC .. H04N 5/3651; H04N 5/3456; H04N 5/3725; H04N 5/3559; H04N 5/3597; H04N 5/357; H04N 5/3765; H04N 17/002
See application file for complete search history.

(56) References Cited

U.S. PATENT DOCUMENTS 9,948,875 B2 * 4/2018 Cremers .............. H04N 17/002
2005/0030402 A1 2/2005 Agranov
(Continued)

OTHER PUBLICATIONS

Kwak et al., "Characterization of Dielectric Relaxation and Reliability of High-k MIM Capacitor Under Constant Voltage Stress," Journal of Semiconductor Technology and Science, vol. 14, No. 5, Oct. 2014.

(Continued)

*Primary Examiner* — Padma Haliyur
(74) *Attorney, Agent, or Firm* — Treyz Law Group, P.C.; Joseph F. Guihan

(57) ABSTRACT

Some image sensors include pixels with capacitors. The capacitor may be used to store charge in the imaging pixel before readout. The capacitor may be a metal-insulator-metal (MIM) capacitor that is susceptible to dielectric relaxation. Dielectric relaxation may cause lag in the signal on the capacitor that impacts the signal on the capacitor during sampling. The image sensor may include dielectric relaxation correction circuitry that leverages the linear relationship between voltage stress and lag signal to correct for dielectric relaxation. The image sensor may include shielded pixels that operate with a similar timing scheme as the imaging pixels in the active array. Measured lag signals from the shielded pixels may be used to correct imaging data.

20 Claims, 15 Drawing Sheets

(51) Int. Cl.
    *H04N 25/72*       (2023.01)
    *H04N 25/445*     (2023.01)

(56) References Cited

U.S. PATENT DOCUMENTS

| | | |
|---|---|---|
| 2007/0211307 A1 | 9/2007 | Uvarov |
| 2009/0127656 A1 | 5/2009 | Basceri et al. |
| 2015/0055002 A1* | 2/2015 | Beck .................... H04N 5/3559 |
| | | 348/308 |
| 2016/0301884 A1 | 10/2016 | Seliuchenko |
| 2018/0302578 A1 | 10/2018 | Ebihara |
| 2019/0222780 A1 | 7/2019 | Chang et al. |
| 2019/0230294 A1 | 7/2019 | Singh et al. |
| 2019/0260949 A1 | 8/2019 | Geurts |
| 2019/0373168 A1 | 12/2019 | Balar et al. |
| 2019/0378864 A1 | 12/2019 | Innocent |
| 2022/0345649 A1* | 10/2022 | Yun ....................... H04N 5/343 |

OTHER PUBLICATIONS

Kundert, "Modeling Dielectric Absorption in Capacitors," The Designer's Guide Community, 2008.
Kundert, "The Fracpole Suite," The Designer's Guide Community, 2008.
Fattaruso et al., "The Effect of Dielectric Relaxation on Charge-Redistribution A/D Converters," IEEE Journal of Solid-State Circuits, vol. 25, No. 6, Dec. 1990.

\* cited by examiner

IMAGE SENSORS HAVING DIELECTRIC RELAXATION CORRECTION CIRCUITRY

This application is a continuation of U.S. non-provisional patent application Ser. No. 17/249,430, filed Mar. 2, 2021, which is hereby incorporated by reference herein in its entirety.

BACKGROUND

This relates generally to imaging devices, and more particularly, to imaging sensors having pixels with capacitors.

Image sensors are commonly used in electronic devices such as cellular telephones, cameras, and computers to capture images. In a typical arrangement, an image sensor includes an array of image pixels arranged in pixel rows and pixel columns. Circuitry may be coupled to each pixel column for reading out image signals from the image pixels.

Each image pixel in the array includes a photodiode that is coupled to a floating diffusion region via a transfer gate. Each pixel receives incident photons (light) and converts the photons into electrical signals. Column circuitry is coupled to each pixel column for reading out pixel signals from the image pixels. Image sensors are sometimes designed to provide images to electronic devices using a Joint Photographic Experts Group (JPEG) format.

Some image sensors include imaging pixels with capacitors. The capacitors may be susceptible to dielectric relaxation (lag). The dielectric relaxation experienced by the capacitor may result in some charge remaining on the capacitor (e.g., a lag signal) after discharge. The lag signal on the capacitors may negatively impact image quality from the image sensor.

It would therefore be desirable to be able to provide improved image sensors with reduced artifacts from lag signals.

DETAILED DESCRIPTION

Embodiments of the present technology relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the pixels and readout circuitry for reading out image signals corresponding to the electric charge generated by the photosensitive elements.

Figure 1:
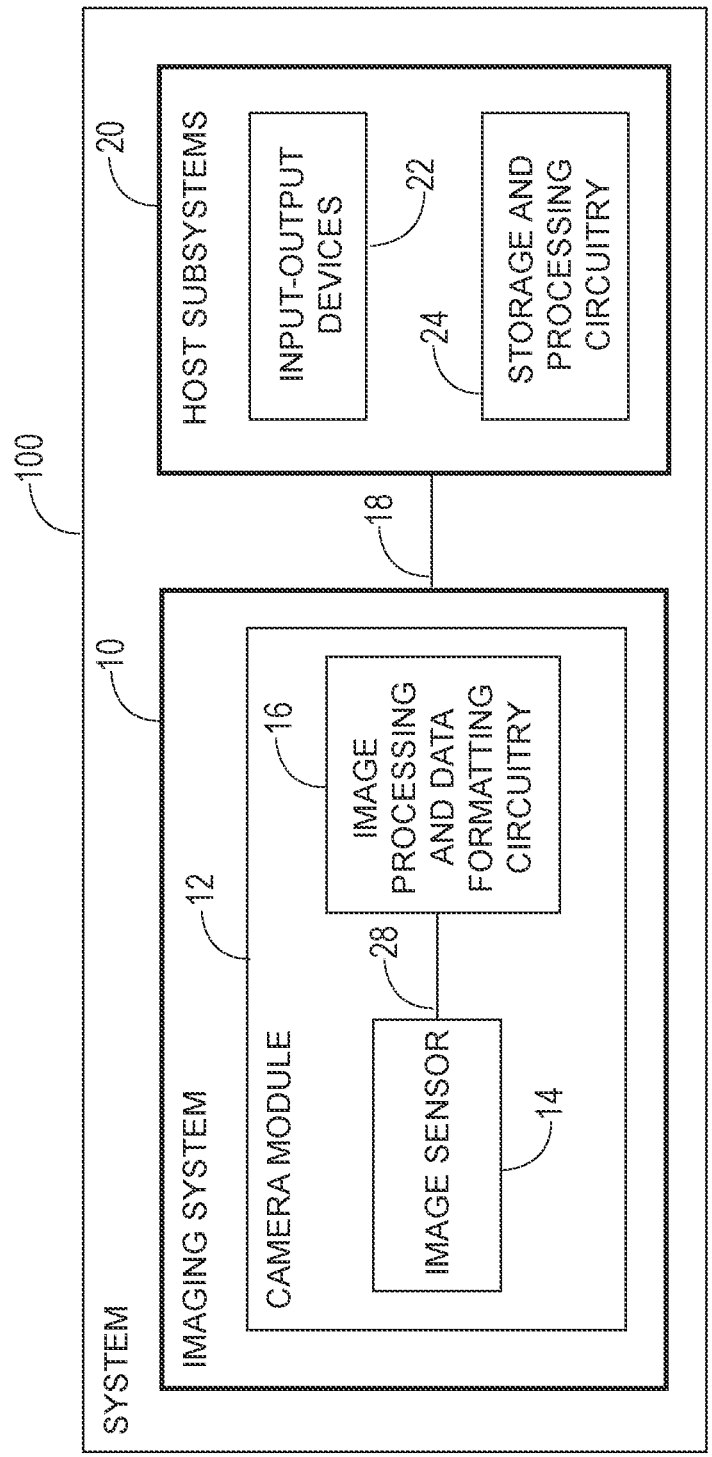
FIG. 1 is a diagram of an illustrative electronic device having an image sensor in accordance with an embodiment.

FIG. 1 is a diagram of an illustrative imaging and response system including an imaging system that uses an image sensor to capture images. System 100 of FIG. 1 may be an electronic device such as a camera, a cellular telephone, a video camera, or other electronic device that captures digital image data, may be a vehicle safety system (e.g., an active braking system or other vehicle safety system), or may be a surveillance system.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses.

Each image sensor in camera module 12 may be identical or there may be different types of image sensors in a given image sensor array integrated circuit. During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), address circuitry, etc.

Still and video image data from camera sensor 14 may be provided to image processing and data formatting circuitry 16 via path 28. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include processing software for detecting objects in images, detecting motion of objects between image frames, determining distances to objects in images, filtering or otherwise processing images provided by imaging system 10.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid-state drives, etc.). Storage and processing circuitry 24 may also include microprocessors, microcontrollers, digital signal processors, application specific integrated circuits, etc.

Figure 2:
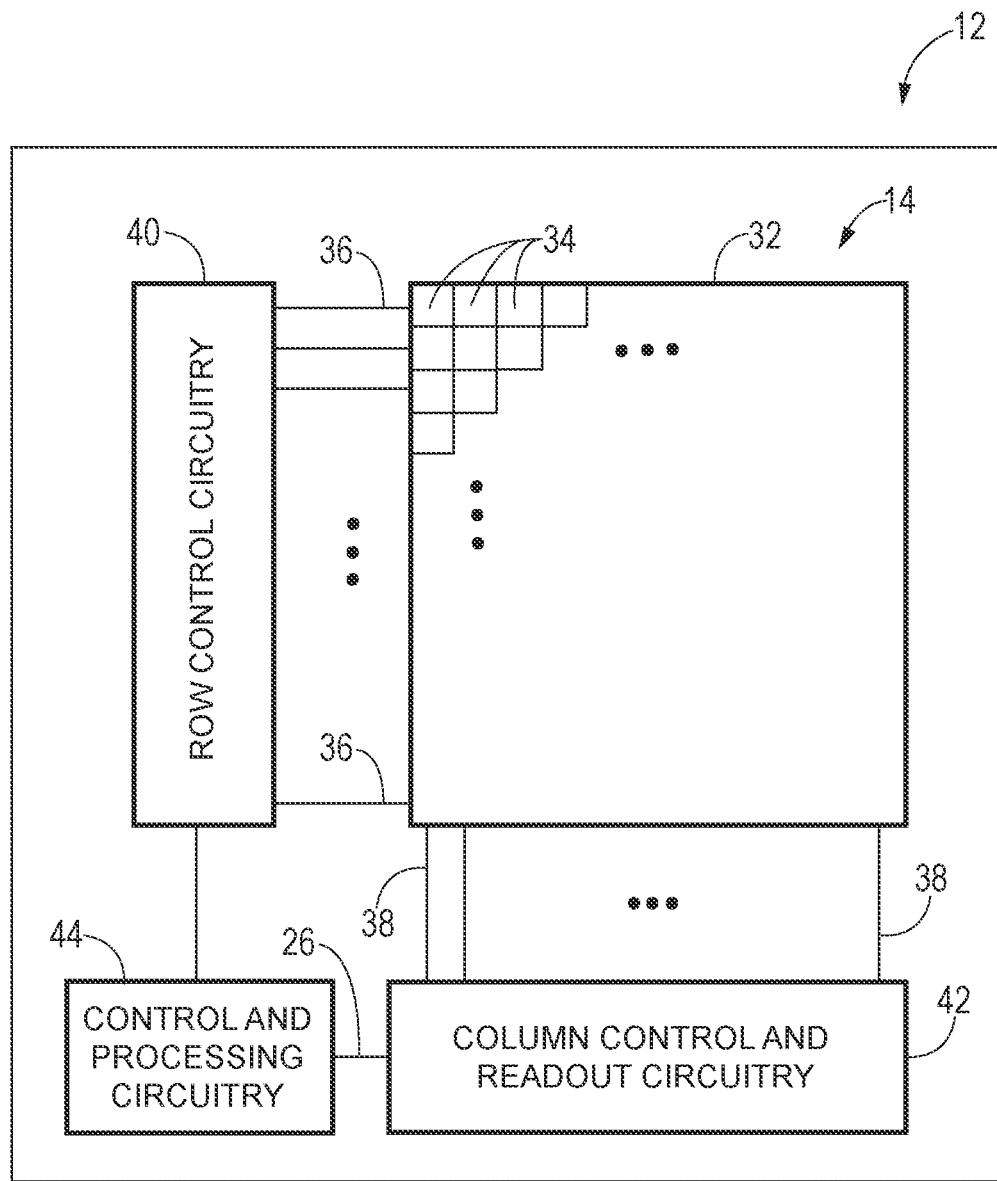
FIG. 2 is a diagram of an illustrative pixel array and associated readout circuitry for reading out image signals in an image sensor in accordance with an embodiment.

An example of an arrangement for camera module 12 of FIG. 1 is shown in FIG. 2. As shown in FIG. 2, camera module 12 includes image sensor 14 and control and processing circuitry 44. Control and processing circuitry 44 may correspond to image processing and data formatting circuitry 16 in FIG. 1. Image sensor 14 may include a pixel array such as array 32 of pixels 34 (sometimes referred to herein as image sensor pixels, imaging pixels, or image pixels 34) and may also include control circuitry 40 and 42. Control and processing circuitry 44 may be coupled to row control circuitry 40 and may be coupled to column control and readout circuitry 42 via data and control path 26. Row control circuitry 40 may receive row addresses from control and processing circuitry 44 and may supply corresponding row control signals to image pixels 34 over control paths 36 (e.g., dual conversion gain control signals, pixel reset control signals, charge transfer control signals, blooming control signals, row select control signals, or any other desired pixel control signals). Column control and readout circuitry 42 may be coupled to the columns of pixel array 32 via one or more conductive lines such as column lines 38. Column lines 38 may be coupled to each column of image pixels 34 in image pixel array 32 (e.g., each column of pixels may be coupled to a corresponding column line 38). Column lines 38 may be used for reading out image signals from image pixels 34 and for supplying bias signals (e.g., bias currents or bias voltages) to image pixels 34. During image pixel readout operations, a pixel row in image pixel array 32 may be selected using row control circuitry 40 and image data associated with image pixels 34 of that pixel row may be read out by column control and readout circuitry 42 on column lines 38.

Column control and readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, and column memory for storing the read out signals and any other desired data. Column control and readout circuitry 42 may output digital pixel values to control and processing circuitry 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

Pixel array 32 may be provided with a color filter array having multiple color filter elements which allows a single image sensor to sample light of different colors. As an example, image sensor pixels such as the image pixels in array 32 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). These examples are merely illustrative and, in general, color filter elements of any desired color and in any desired pattern may be formed over any desired number of image pixels 34.

If desired, array 32 may be part of a stacked-die arrangement in which pixels 34 of array 32 are split between two or more stacked substrates. In such an arrangement, each of the pixels 34 in the array 32 may be split between the two dies at any desired node within the pixel. As an example, a node such as the floating diffusion node may be formed across two dies. Pixel circuitry that includes the photodiode and the circuitry coupled between the photodiode and the desired node (such as the floating diffusion node, in the present example) may be formed on a first die, and the remaining pixel circuitry may be formed on a second die. The desired node may be formed on (i.e., as a part of) a coupling structure (such as a conductive pad, a micro-pad, a conductive interconnect structure, or a conductive via) that connects the two dies. Before the two dies are bonded, the coupling structure may have a first portion on the first die and may have a second portion on the second die. The first die and the second die may be bonded to each other such that first portion of the coupling structure and the second portion of the coupling structure are bonded together and are electrically coupled. If desired, the first and second portions of the coupling structure may be compression bonded to each other. However, this is merely illustrative. If desired, the first and second portions of the coupling structures formed on the respective first and second dies may be bonded together using any metal-to-metal bonding technique, such as soldering or welding.

As mentioned above, the desired node in the pixel circuit that is split across the two dies may be a floating diffusion node. Alternatively, the desired node in the pixel circuit that is split across the two dies may be the node between a floating diffusion region and the gate of a source follower transistor (i.e., the floating diffusion node may be formed on the first die on which the photodiode is formed, while the coupling structure may connect the floating diffusion node to the source follower transistor on the second die), the node between a floating diffusion region and a source-drain node of a transfer transistor (i.e., the floating diffusion node may be formed on the second die on which the photodiode is not located), the node between a source-drain node of a source follower transistor and a row select transistor, or any other desired node of the pixel circuit.

In general, array 32, row control circuitry 40, column control and readout circuitry 42, and control and processing circuitry 44 may be split between two or more stacked substrates. In one example, array 32 may be formed in a first substrate and row control circuitry 40, column control and readout circuitry 42, and control and processing circuitry 44 may be formed in a second substrate. In another example, array 32 may be split between first and second substrates (using one of the pixel splitting schemes described above) and row control circuitry 40, column control and readout circuitry 42, and control and processing circuitry 44 may be formed in a third substrate.

In some image sensors, one or more pixels 34 may include a capacitor. The capacitor may be used to store charge in the imaging pixel before readout, as one example. The capacitor may be used to implement a dual conversion gain mode for the imaging pixel, may increase the dynamic range of the imaging pixel, etc.

There are many types of pixels that may incorporate a capacitor. An illustrative example of a pixel with a capacitor is shown in FIG. 3.

Figure 3:
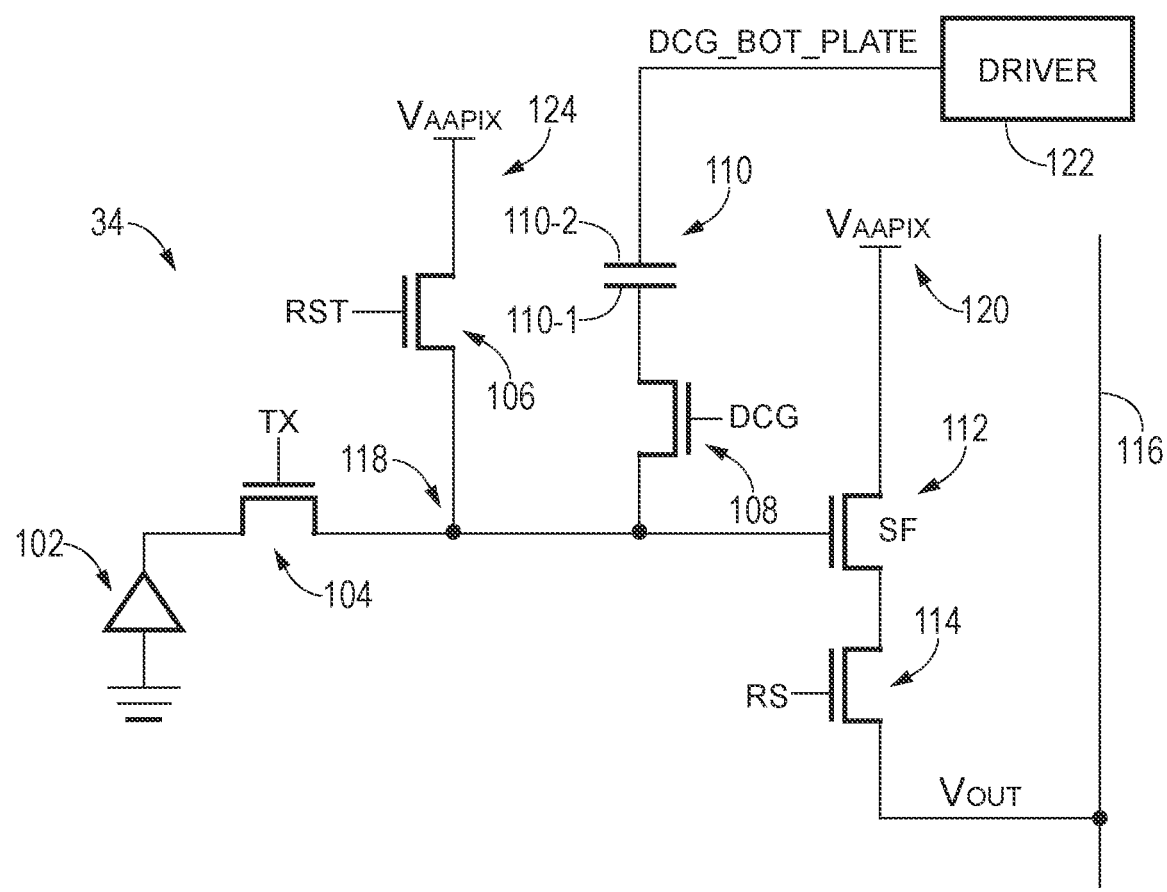
FIG. 3 is a circuit diagram of an illustrative imaging pixel with a storage capacitor in accordance with an embodiment.

As shown in FIG. 3, image pixel 34 includes photosensitive element 102 (e.g., a photodiode). Photosensitive element 102 has a first terminal that is coupled to ground. The second terminal of photosensitive element 102 is coupled to transfer transistor 104. Transfer transistor 104 is coupled to floating diffusion (FD) region 118. A reset transistor 106 may be coupled between floating diffusion region 118 and voltage supply 124. Floating diffusion region 118 may be a doped semiconductor region (e.g., a region in a silicon substrate that is doped by ion implantation, impurity diffusion, or other doping process). Floating diffusion 118 has an associated capacitance. Gain select transistor 108 has a first terminal coupled to floating diffusion region 118 and a second terminal coupled to dual conversion gain capacitor 110 (sometimes referred to as storage capacitor 110). Dual conversion gain capacitor 110 may have a first plate 110-1 (sometimes referred to as an upper plate or top plate) coupled to the second terminal of the gain select transistor. Dual conversion gain capacitor 110 may have a second plate 110-2 (sometimes referred to as a lower plate or bottom plate) that receives a capacitor plate signal (DCG_BOT_PLATE) from driver 122.

Source-follower transistor 112 has a gate terminal coupled to floating diffusion region 118 and a first terminal of gain select transistor 108. Source-follower transistor 112 also has a first source-drain terminal coupled to voltage supply 120. Voltage supplies 120 and 124 may both provide a power supply voltage ($V_{AAPIX}$) The power supply voltage at power supplies 120 and 124 may be the same or may be different. In this application, each transistor is illustrated as having three terminals: a source, a drain, and a gate. The source and drain terminals of each transistor may be changed depending on how the transistors are biased and the type of transistor used. For the sake of simplicity, the source and drain terminals are referred to herein as source-drain terminals or simply terminals. A second source-drain terminal of source-follower transistor 112 is coupled to column output line 116 through row select transistor 114.

A gate terminal of transfer transistor 104 receives control signal TX. A gate terminal of gain select transistor 108 receives control signal DCG. A gate terminal of reset transistor 106 receives control signal RST. A gate terminal of row select transistor 114 receives control signal RS. Control signals TX, DCG, RST, RS may be provided by row control circuitry (e.g., row control circuitry 40 in FIG. 2) over control paths (e.g., control paths 36 in FIG. 2). Driver 122, which provides signal DCG_BOT_PLATE, may be a part of the row control circuitry (e.g., row control circuitry 40 in FIG. 2). There may be one driver 122 per row, as an example. Drivers 122 may provide signals DCG_BOT_PLATE over control paths such as control paths 36 in FIG. 2.

Gain select transistor 108 and dual conversion gain capacitor 110 may be used by pixel 34 to implement a dual conversion gain mode. In particular, pixel 34 may be operable in a high conversion gain mode and in a low conversion gain mode. If gain select transistor 108 is disabled, pixel 34 will be placed in a high conversion gain mode. If gain select transistor 108 is enabled, pixel 34 will be placed in a low conversion gain mode. When gain select transistor 108 is turned on, the dual conversion gain capacitor 110 may be switched into use to provide floating diffusion region 118 with additional capacitance. This results in lower conversion gain for pixel 34. When gain select transistor 108 is turned off, the additional loading of the capacitor is removed and the pixel reverts to a relatively higher pixel conversion gain configuration.

The capacitor used in the imaging pixel may be susceptible to dielectric relaxation. Imaging pixels may use metal-insulator-metal (MIM) capacitors. MIM capacitors are formed by two conductive (metal) plates separated by a dielectric material. These MIM capacitors may be susceptible to dielectric relaxation.

Figure 4A:
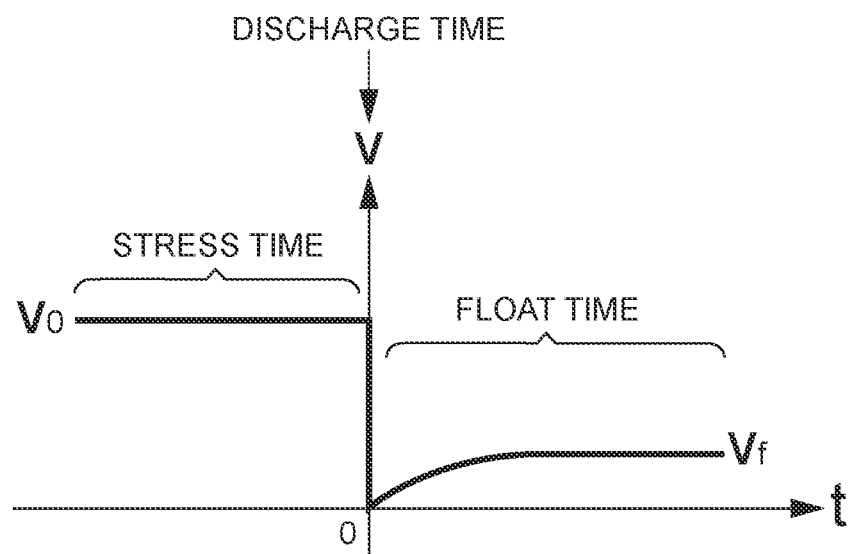
FIG. 4A is a graph of capacitor voltage over time showing how dielectric relaxation may result in a lag signal on the capacitor after discharge in accordance with an embodiment.

FIG. 4A is a graph of voltage over time showing the effect of dielectric relaxation on a capacitor. As shown, the capacitor may be stressed at voltage $v_0$ during a stress time. The capacitor may then be discharged during a discharge time. During the discharge time, the capacitor may be reset to a reset voltage.

Figure 4B:
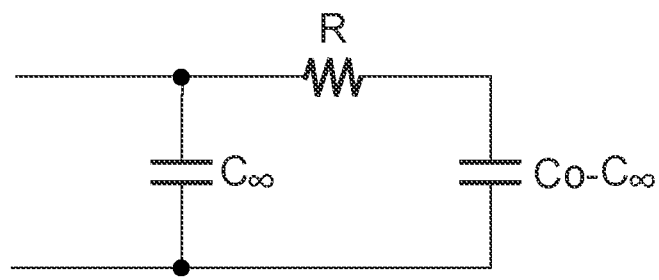
FIG. 4B is an RC model of a capacitor that undergoes dielectric relaxation as described in FIG. 4A in accordance with an embodiment.

Dielectric relaxation may be modeled using a RC model with first and second capacitances (e.g., $C_\infty$ and $C_0 - C_\infty$) coupled in parallel, as shown in FIG. 4B. A resistor (R) may be coupled between the first and second capacitors in the RC model. When the stress time is sufficiently long, both $C_\infty$ and $C_0 - C_\infty$ are fully charged to Vo. When the capacitor is discharged quickly (e.g., as in FIG. 4), $C_\infty$ may be completely discharged while $C_0$-$C_\infty$ is not. During a float time, the remaining charge on $C_0$-$C_\infty$ redistributes over the two parts of the capacitor and a voltage ($V_f$) reappears across the capacitor. The lag signal opposes change. Therefore, the change in signal at the capacitor is not as large as expected.

The magnitude of the lag signal at the pixel output at any given point of time is dependent upon a number of variables. For example, the stress time of the frame (e.g., the length of the integration time), the float time of the frame (e.g., the length of time the capacitor is in a floating state), the reset time of the frame (e.g., the length of time that the storage capacitor has to discharge during reset operations), and voltage stress (e.g., the magnitude of the voltage difference across the capacitor plates) all may influence the magnitude of the lag signal in the capacitor. Stress time, float time, reset time, and voltage stress are all independent variables that impact the lag signal.

Figure 5A:
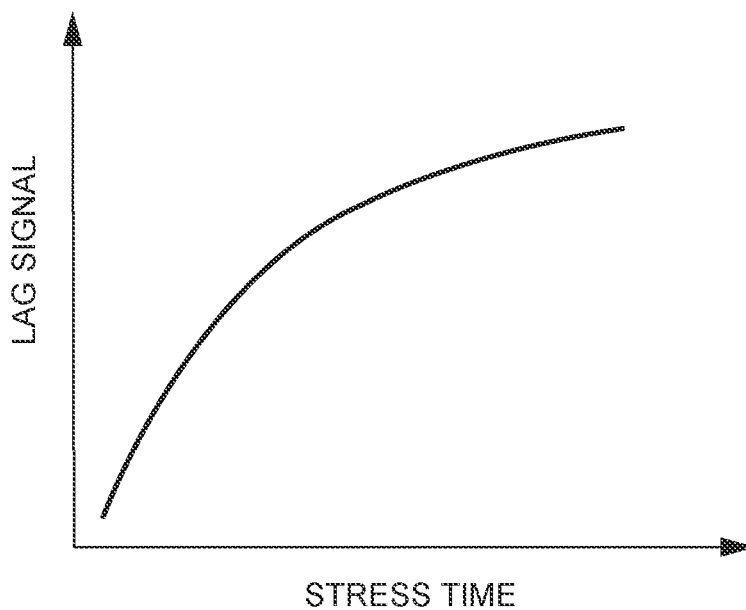
FIG. 5A is a graph showing the relationship between lag signal and stress time in a capacitor in accordance with an embodiment.

Because of the number of variables that influence the lag signal, it may be difficult to universally correct for the lag signal during different operating conditions of the image sensor. In addition to having multiple independent variables affecting the lag signal, some of the independent variables have non-linear responses. FIG. 5A is a graph of lag signal versus stress time (assuming float time, reset time, and voltage stress remain constant). As shown, the lag signal (e.g., the magnitude of charge on the capacitor present due to dielectric relaxation) has a logarithmic relationship with stress time. The lag signal may also have a non-linear relationship with float time and reset time.

Figure 5B:
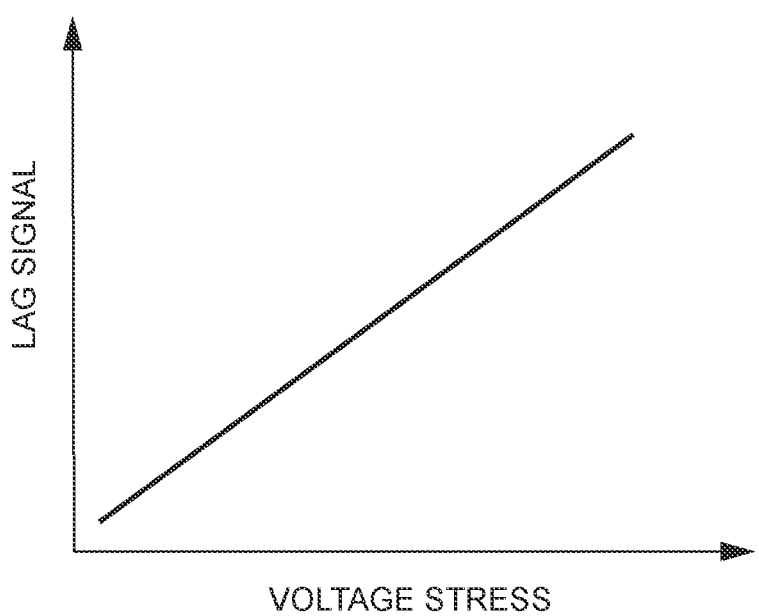
FIG. 5B is a graph showing the relationship between lag signal and voltage stress in a capacitor in accordance with an embodiment.

FIG. 5B is a graph of lag signal versus voltage stress. As shown, the lag signal has a linear relationship with voltage stress. This linear relationship makes the voltage stress an easier variable to use for determining the magnitude of the lag signal.

Figure 6:
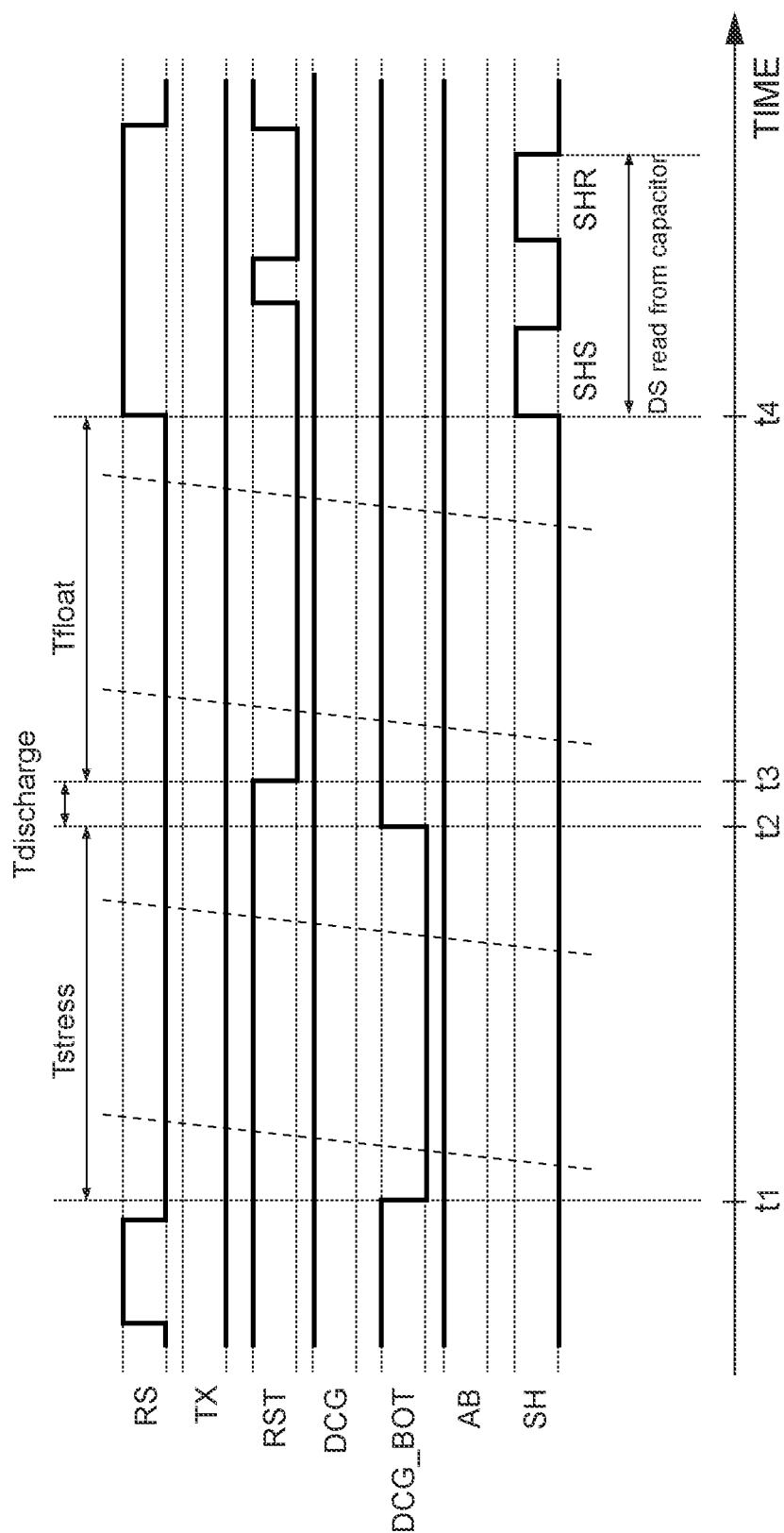
FIG. 6 is a timing diagram showing how an imaging pixel (such as the imaging pixel of FIG. 3) may be used to measure a lag signal in accordance with an embodiment.

FIG. 6 is a timing diagram showing how the lag signal may be measured in an imaging pixel (e.g., the imaging pixel of FIG. 3). As shown in FIG. 6, between $t_1$ and $t_2$, a stress may be applied to capacitor 110 by lowering DCG_BOT (sometimes referred to as DCG_BOT_PLATE). Simultaneously, RST and DCG are high such that transistors 106 and 108 are asserted. The supply voltage $V_{AAPIX}$ is therefore applied to plate 110-1 of capacitor 110. This differential applies a voltage stress to the capacitor.

The stress time may conclude at $t_2$, when DCG_BOT is raised (e.g., to the same voltage as $V_{AAPIX}$) The capacitor is therefore discharged. At $t_3$, the discharge time concludes and RST is lowered to deassert reset transistor 106. This disconnects capacitor plate 110-1 from the supply voltage, which means capacitor 110 is left floating during the float time. At the end of the float time, a double sampling read may be performed to read the charge that remains on the capacitor due to dielectric relaxation lag. The lag signal sample is read at $t_4$. Subsequently, the floating diffusion region is reset, and the reset signal is sampled as well. The difference between the lag signal sample and the reset signal may be equal to the magnitude of the lag signal on the capacitor.

It should be noted that, in this example, the TX signal is low throughout the lag measurement procedure (in order to prevent charge from photodiode 102 from being included in the measurement). An optional anti-blooming transistor controlled by signal AB (e.g., that couples the photodiode directly to a power supply voltage) may be asserted throughout the lag measurement procedure to prevent charge accumulating and overflowing from photodiode 102.

Lag compensation may be used to compensate for steady state effects and/or transient effects. In the steady state case, an assumption is made that the current image is equal to the previous image. In other words, the image is assumed to not change frame to frame. Under this assumption, lag compensation may be performed without including any additional memory. However, the assumption of the image not changing between frames may not always be correct.

To compensate for transient effects (where consecutive image frames are not necessarily the same), memory (e.g., a frame buffer) may be included in the image sensor to store the previous frame. When correcting a given frame, information regarding the previous frame may be accessed from the frame buffer to compensate for the lag signal in the given frame.

Figure 7:
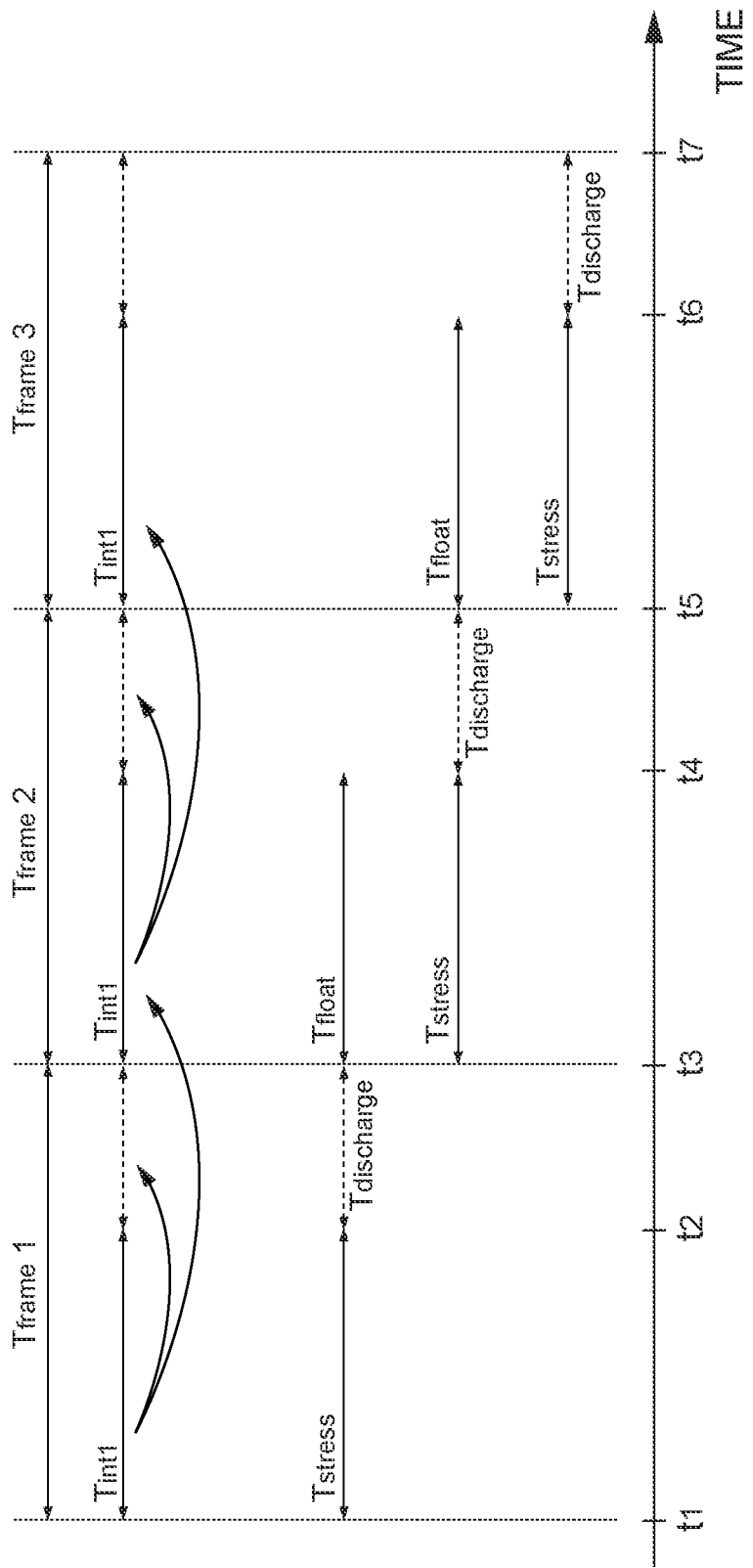
FIG. 7 is a timing diagram showing how a steady state lag signal may be compensated in frames with one exposure period in accordance with an embodiment.

FIG. 7 is a timing diagram showing an example of how lag signal may be corrected in a steady state and single exposure case. As shown in FIG. 7, a first frame takes place between $t_1$ and $t_3$, a second frame takes place between $t_3$ and $t_5$, and a third frame takes place between $t_5$ and $t_7$. Each frame may include an integration time Tina (e.g. between $t_1$ and $t_2$ in FIG. 7) and a non-integrating time (e.g., between $t_2$ and $t_3$) in which the pixel may be kept in reset (discharge). During the integration time, charge accumulates in the photodiode. Charge may overflow from the photodiode onto a capacitor (e.g., 110 in FIG. 3) in the pixel, resulting in a stress time $T_{STRESS}$ for the capacitor. The pixel is read out at the end of the integrating time. Subsequently, the capacitor may be discharged during the non-integrating period (e.g., between $t_2$ and $t_3$ for frame 1, between $t_4$ and $t_5$ for frame 2, etc.).

Each integration time therefore serves as a stress time for all later integration times and a float time for all previous integration times. The lag signal may be primarily caused by one previous frame, but multiple previous frames may be accounted for during compensation if desired.

The stress caused during the integration time of frame 1 may therefore result in a lag signal in both the frame 1 readout and the frame 2 integration period (which will impact the frame 2 readout).

Since there is discharge time (where charge is released) between two integration times (e.g., between $t_2$ and $t_3$ in FIG. 7), more charge can be absorbed in an integration time than is released again in the next integration time. This causes a gain reduction for $T_{INT1}$.

Figure 8:
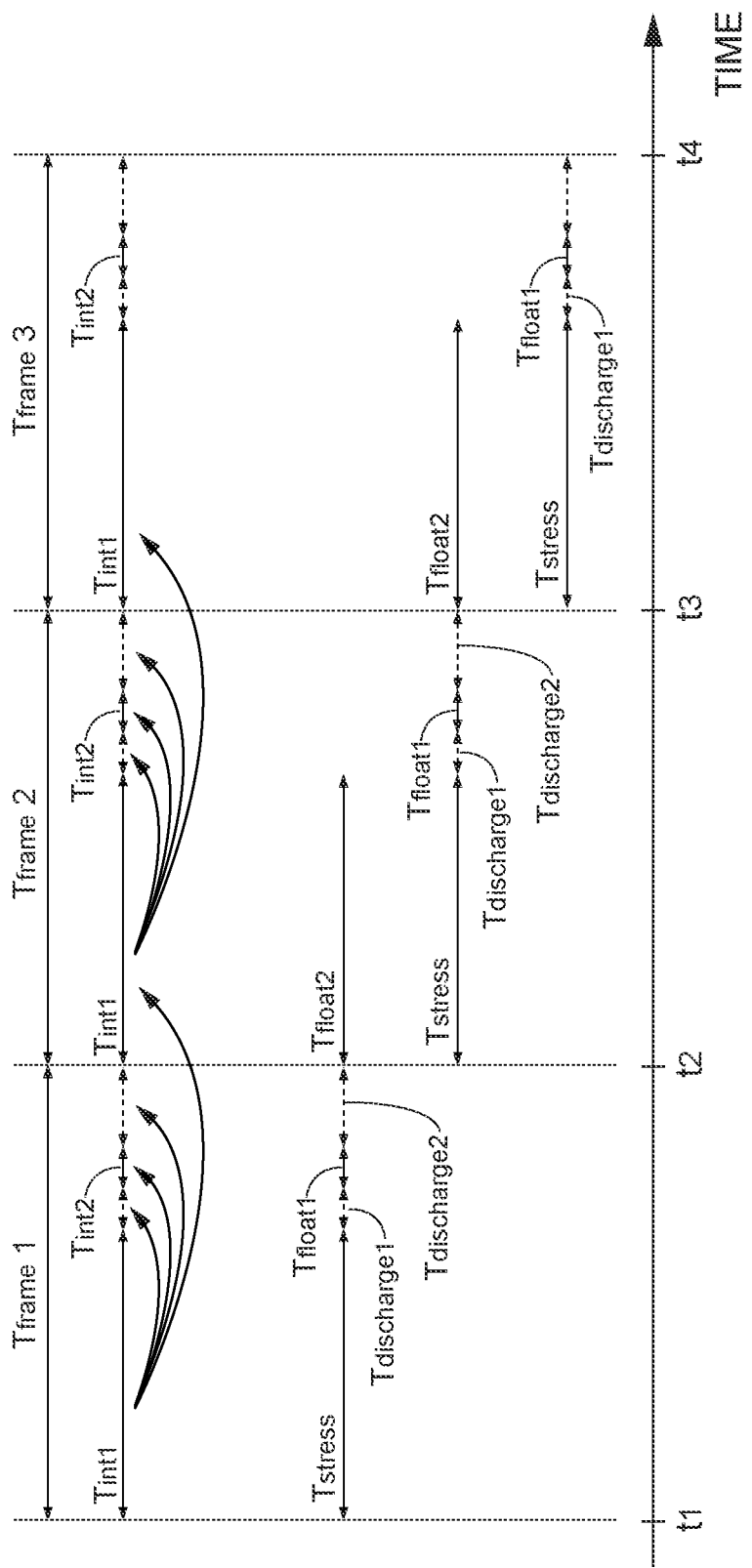
FIG. 8 is a timing diagram showing how a steady state lag signal may be compensated in frames with multiple exposure periods in accordance with an embodiment.

In some cases, an imaging pixel may operate with multiple exposures (integration times) in each frame. FIG. 8 is a timing diagram showing an example of how lag signal may be corrected in a steady state and multiple exposure case. As shown in FIG. 8, a first frame takes place between $t_1$ and $t_2$, a second frame takes place between $t_2$ and $t_3$, and a third frame takes place between $t_3$ and $t_4$. During each frame, there is a first integration time Tint1 and a second integration time Tint2. Between the first and second integration times there may be a first readout for the first integration time. After the second integration time there may be a second readout for the second integration time.

As shown in FIG. 8, the integration time of frame 1 serves as a stress time. The following non-integrating time serves as a first discharge time $T_{DISCHARGE1}$, the second integration time serves as a first float time $T_{FLOAT1}$, the following non-integrating time serves as a second discharge time $T_{DISCHARGE2}$, and the integration time of frame 2 serves as a second float time $T_{FLOAT2}$. The lag signal caused by $T_{INT1}$ of frame 1 will therefore result in a lag signal in both the frame 1 readouts, the second frame 1 integration period $T_{INT2}$ (which will impact the second frame 1 readout), and the first frame 2 integration period $T_{INT1}$ (which will impact the first frame 2 readout).

Since there is discharge time (where charge is released) between two integration times (e.g., between $T_{INT1}$ and $T_{INT2}$), more charge can be absorbed in an integration time than is released again in the next integration time. This causes a gain reduction on $T_{INT1}$. At the same time there is typically more charge released in $T_{INT2}$ than absorbed, so in $T_{INT2}$ there is gain increase.

Figure 9:
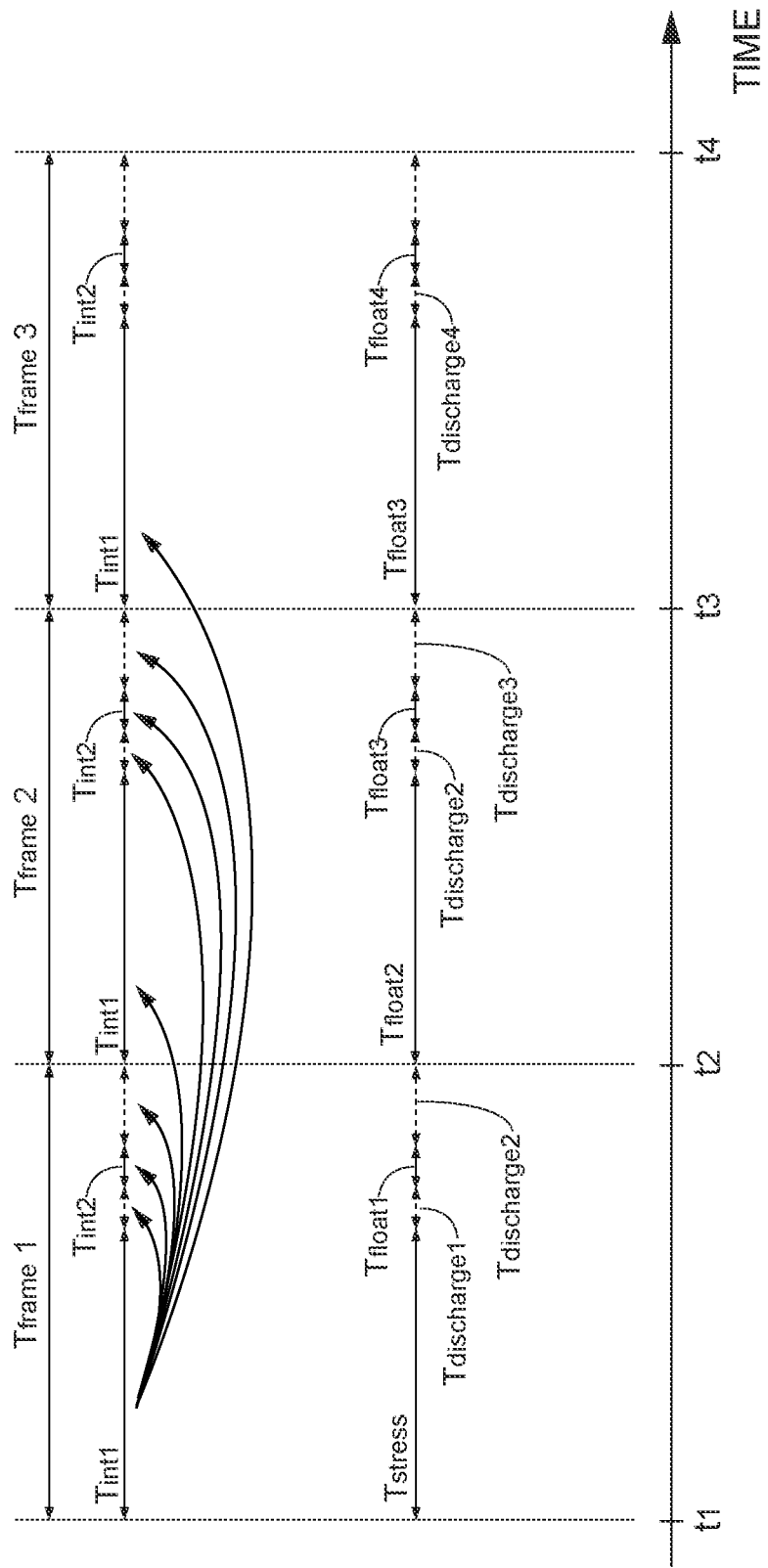
FIG. 9 is a timing diagram showing how a transient lag signal may be compensated in frames with multiple exposure periods in accordance with an embodiment.

FIG. 9 is a timing diagram showing an example of how lag signal may be corrected in a transient and multiple exposure case. As shown, the stress time of the first integration time $T_{INT1}$ may result in a lag signal for all future integration times. By storing data regarding the image frame in memory (e.g., a frame buffer), the transient effects of the lag signal may be compensated.

Compensating for transient effects may mitigate ghost images from the image sensor. An example of a ghost image occurs when a brightly illuminated frame is followed by a dark frame. In the dark frame, a residue of the previous, brightly illuminated frame (e.g., a ghost image) is visible.

Figure 10:
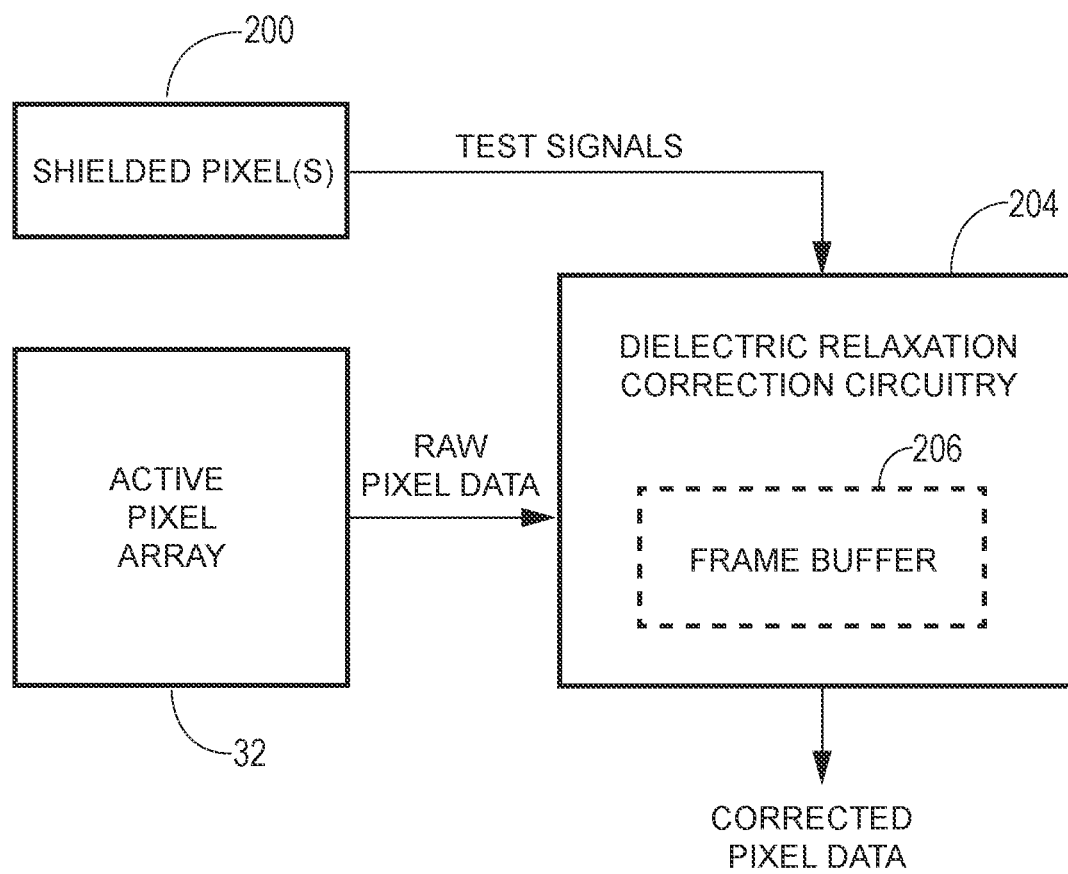
FIG. 10 is a diagram of an illustrative image sensor that includes an active pixel array, shielded pixels, and dielectric relaxation correction circuitry in accordance with an embodiment.

FIG. 10 is a diagram of an illustrative image sensor that includes dielectric relaxation correction circuitry. The dielectric relaxation correction circuitry may leverage the linear relationship between voltage stress and lag signal to correct for dielectric relaxation. Specifically, the image sensor may include shielded pixels that are blocked from incident light. The DCG_BOT_PLATE signal may be used to apply known voltage stresses to the capacitors of the shielded pixels. Importantly, the shielded pixels may operate with the same (or a similar) timing scheme as the imaging pixels in the active array. Therefore, the time-based variables (stress time, reset time, and float time) that influence lag signal are the same for both the active imaging pixels and the shielded pixels. The only remaining variable is voltage stress. By applying at least one known voltage stress to the shielded pixels and measuring the corresponding lag signal, the linear relationship between lag signal and voltage stress may be determined (for the present timing scheme) by the dielectric relaxation correction circuitry. Since the timing schemes of the shielded pixels and the imaging pixels are the same, the identified lag signal function (identified using the shielded pixels) may be applied to the active imaging pixels in the array. The lag signal function may be used to correct signals from the active imaging pixels for dielectric relaxation. If the pixel timing scheme ever needs to be updated, a new lag signal function may be determined (using the shielded pixels operating with the new timing scheme) and applied to the imaging pixels.

As shown in FIG. 10, image sensor 14 may include shielded pixels 200 in addition to active pixel array 32. The shielded pixels 200 may have the same circuit design and structure as the active imaging pixels in array 32. For example, each shielded pixel and imaging pixel may have the design as shown in FIG. 3. However, the shielded pixels 200 (sometimes referred to as optically black pixels) are covered by an opaque material that blocks the photodiodes from receiving incident light. Any opaque material may be used to cover the shielded pixels (e.g., metal, black ink, etc.). The opaque material may have a transparency of less than 5%, less than 1%, less than 0.1%, less than 0.01%, etc.

During testing operations (sometimes referred to as calibration operations or lag signal measurement operations), the shielded pixels 200 may operate with a similar timing scheme to the imaging pixels of array 32. Specifically, the stress time, float time, and reset time for the pixels 200 and pixels 32 may be the same or similar (e.g., within a factor of 3, within a factor of 2, within 50%, within 20%, within 10%, within 5%, within 1%, etc.).

For pixels 32, during the stress time (integration time), charge generated by the photodiodes in the pixels in response to incident light may be stored on the storage capacitor. For shielded pixels 200, during the stress time, DCG_BOT_PLATE may be adjusted to deliberately apply a known voltage stress to the storage capacitor. Because the pixels are shielded, incident light levels do not impact the test signals from shielded pixels 200. The sampled test signals therefore serve as an isolated measure of the lag signal associated with the current operating conditions (e.g., voltage stress, stress time, float time, and reset time) of the image sensor.

Dielectric relaxation correction circuitry 204 (sometimes referred to as correction circuitry 204, lag correction circuitry 204, processing circuitry 204, etc.) may receive the test signals from shielded pixels 200. There is a linear relationship between lag signal and voltage stress while stress time, float time, and reset time are constant. The test signals may be used determine a representative lag signal for a given applied voltage stress magnitude. The magnitude of the lag signal and the voltage stress magnitude may be used as a data point in the voltage stress versus lag signal function (slope). Since the voltage stress versus lag signal relationship is assumed to be linear, and the lag signal may be assumed to be approximately 0 with no applied voltage stress, the obtained data point (in combination with a (0,0) data point) may be used to determine the lag signal versus voltage stress function.

This example is merely illustrative. If desired, multiple lag signal versus voltage stress data points may be obtained using the shielded pixels (e.g., sequentially using the same one or more pixels, simultaneously using different groups of one or more pixels for different conditions, etc.). Multiple data points may be used to compensate for any offset even if the lag signal versus voltage stress relationship is linear. In the event of a non-linear lag signal versus voltage stress relationship, multiple data points may be used to approximate the lag signal versus voltage stress function. The samples from one or more shielded pixels may be averaged to obtain any given lag signal versus voltage stress data point.

Meanwhile, pixel data from active pixel array 32 is obtained (e.g., using the stress time, float time, and reset/discharge time conditions that the shielded pixels 200 use to generate the test signals). The pixel data is provided to the dielectric relaxation (DR) correction circuitry 204. The DR correction circuitry 204 may, using the lag signal versus voltage stress function identified using the test signals, correct the raw pixel data for dielectric relaxation and output corrected pixel data.

The dielectric relaxation correction circuitry may optionally include a frame buffer 206. If the frame buffer is not included, the dielectric relaxation correction circuitry may correct for the steady state effects of dielectric relaxation. If the frame buffer is included, the dielectric relaxation correction circuitry may correct for transient effects of dielectric relaxation.

Without the frame buffer, dielectric relaxation correction circuitry 204 assumes that the magnitude of sampled charge from a given integration period is the same as the charge from the previous frame. The assumed value for charge from the previous frame is then used to determine the magnitude of lag signal present in the pixel signal.

With the frame buffer, dielectric relaxation correction circuitry 204 uses the actual magnitude of charge from the previous frame to determine the magnitude of lag signal present in the pixel signal.

Figure 11:
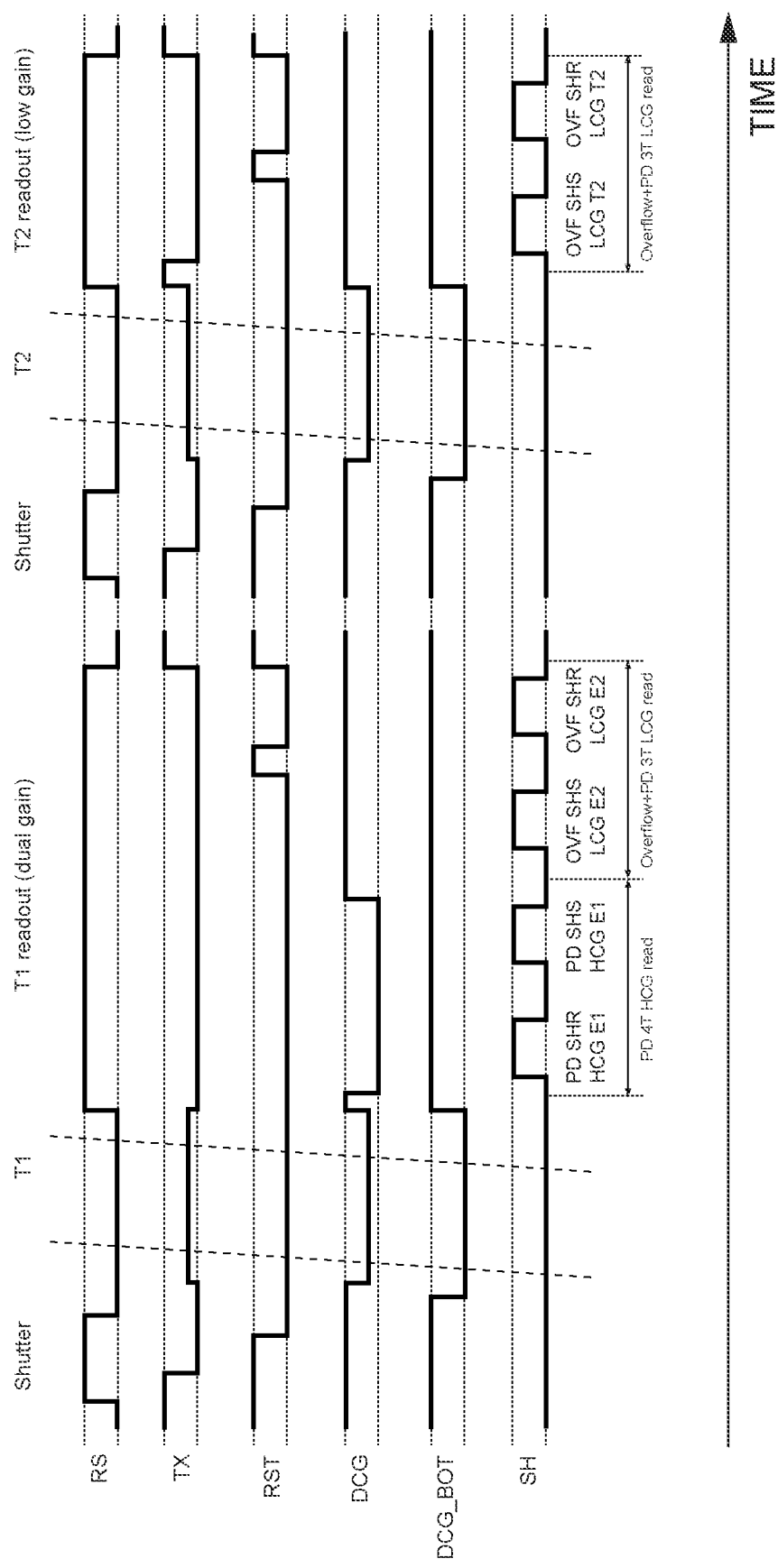
FIG. 11 is a timing diagram showing an illustrative operation for an active imaging pixel in accordance with an embodiment.
Figure 12:
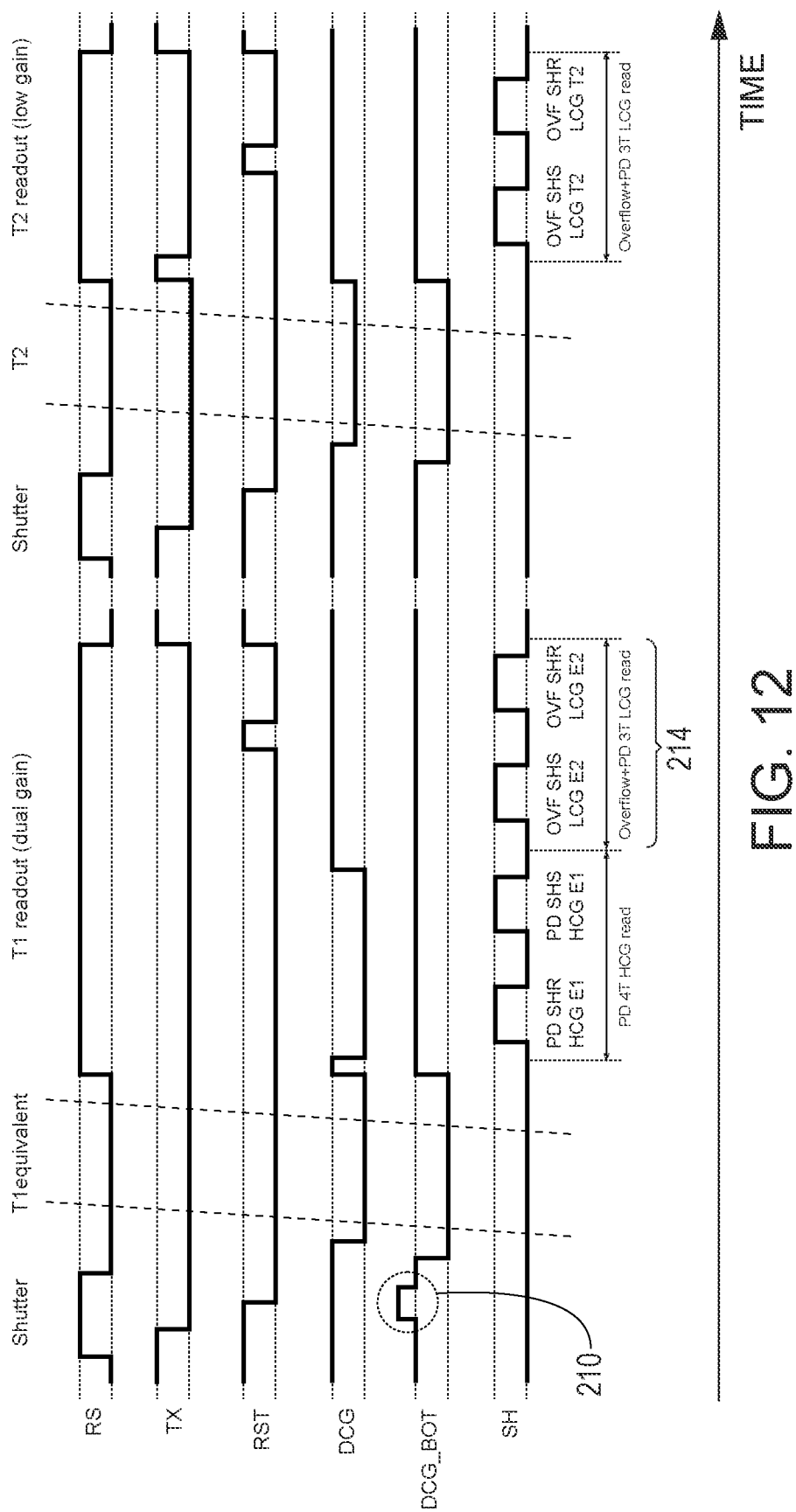
FIG. 12 is a timing diagram showing an illustrative operation for a shielded pixel to measure a lag signal in accordance with an embodiment.
Figure 13:
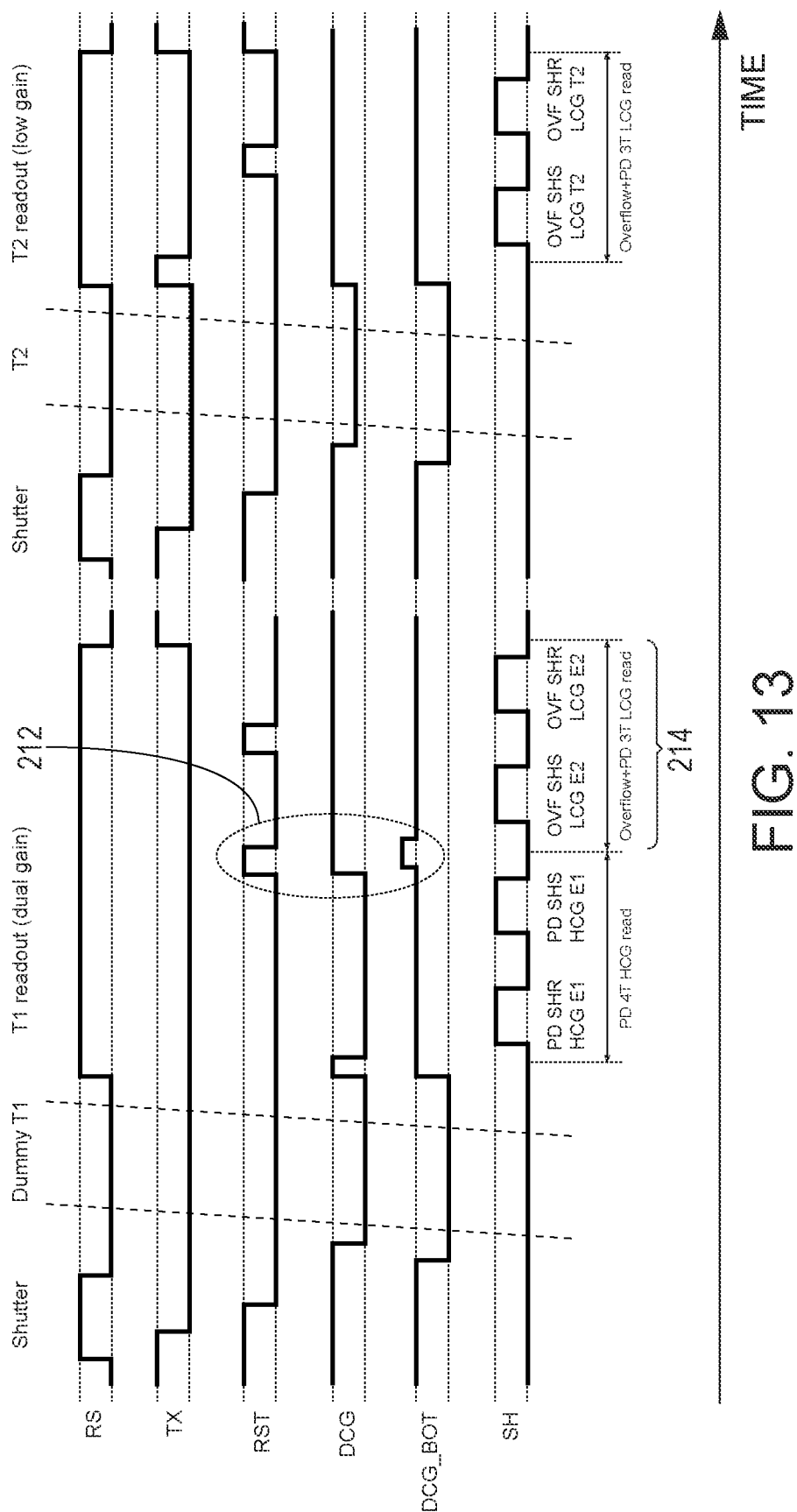
FIG. 13 is a timing diagram showing an illustrative operation for a shielded pixel to measure a reference signal in accordance with an embodiment.

FIGS. 11-13 are timing diagrams showing the operation of the active pixels and shielded pixels of FIG. 10. Specifically, FIG. 11 shows the operation of the active pixels in the image sensor. FIG. 12 shows the operation of the shielded pixels during measurement of a lag signal. FIG. 13 shows the operation of the shielded pixels during a reference measurement.

FIG. 11 shows an illustrative method of operating the active pixels with multiple exposures (e.g., a first integration time T1 and a second integration time T2, similar to as shown in FIGS. 8 and 9). During T1 and T2, the TX and DCG signals may be held at an intermediate level to allow charge to overflow from the photodiode to the floating diffusion region and storage capacitor 110. FIG. 11 shows an example with two readouts. First, there is a high conversion gain correlated double sampling (e.g., the PD 4T HCG read). Next, there is a low conversion gain double sampling (e.g., the Overflow+PD 3T LCG read). After the second integration time T2, there is an additional low conversion gain double sampling (e.g., the Overflow+PD 3T LCG read). The signal on the capacitor (that is sampled during the Overflow+PD 3T LCG reads) will be subject to lag.

FIG. 12 shows an example of a lag signal being measured by the shielded pixels. As shown, DCG_BOT may be modulated to inject charge onto the capacitor at charge injection 210 in FIG. 12. The charge injection may occur during the shutter phase of the frame (e.g., at the falling edge of the reset signal RST). The signal prompted by this charge injection may remain on the capacitor during the integration time until it is read out (e.g., during the readout 214 in FIG. 12). During this time, the signal on the capacitor is subject to lag. The T1 equivalent integration time may be approximately equal (in duration) to the T1 integration time shown in FIG. 11. The T1 equivalent integration time may be within 20% of the T1 integration time, within 10% of the T1 integration time, within 5% of the T1 integration time, within 1% of the T1 integration time, etc. The effect of the lag on the T2 integration period may be determined based on the T2 readout. For the transient case, the effect of the lag on the T1 integration time of the next frame may also be determined by having a subsequent frame with normal operation following the frame with charge injection of FIG. 12.

FIG. 13 shows an example of a reference signal being measured by the shielded pixels. As shown, DCG_BOT may be modulated to inject charge onto the capacitor at charge injection 212 in FIG. 13. The charge injection may occur just before readout 214 to minimize lag in the sampled signals. The samples from FIG. 13 may be assumed to be a 'lag-free' data point for the magnitude of charge injection used. The measurement of the 'lag-free' data point may be subtracted from the lag signal identified using the operation of FIG. 12. The difference between these two magnitudes may be a measurement of the magnitude of the contribution of the lag signal (that is associated with the magnitude of voltage stress caused by the charge injections 210/212). The charge injections 210/212 may be of the same magnitude (e.g., causing a voltage stress of the same magnitude) to ensure a comparison of the same operating conditions.

Figure 14:
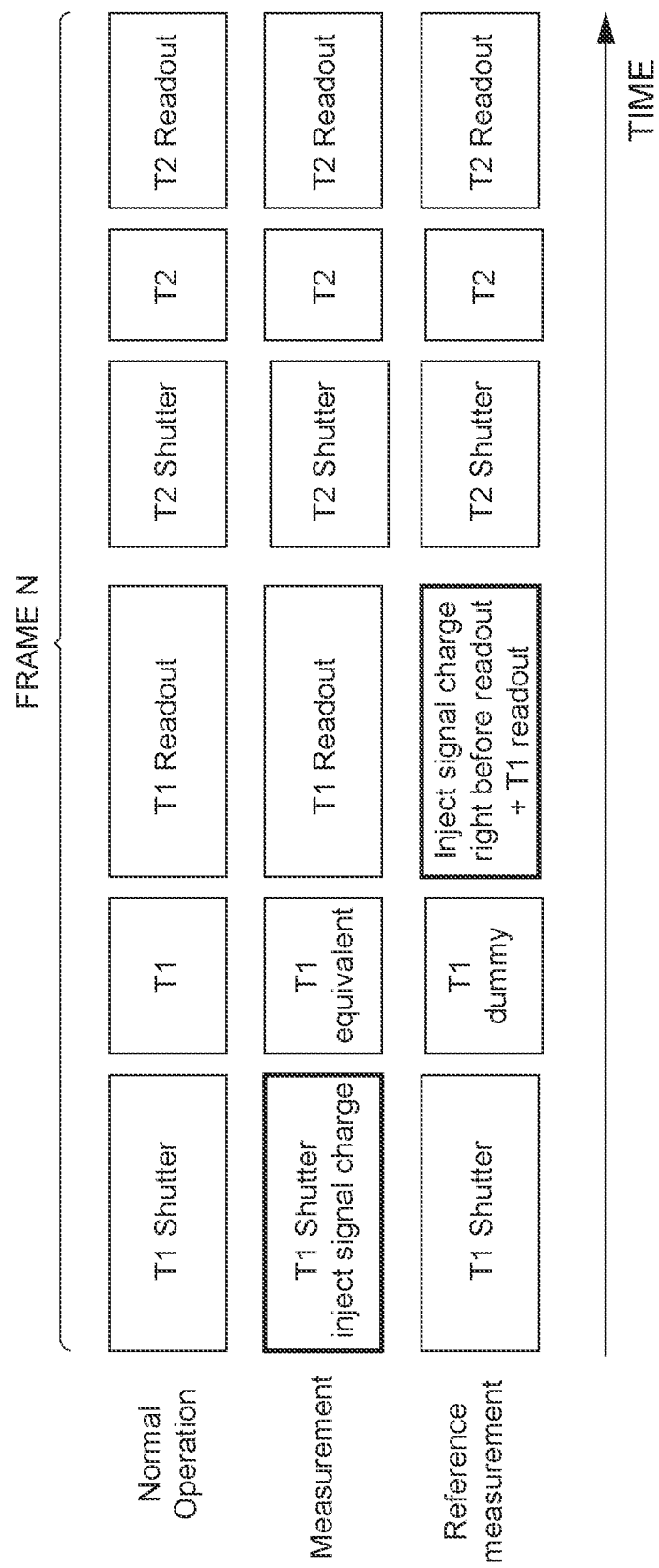
FIG. 14 is a timing diagram showing illustrative timing schemes for pixels in normal operation, obtaining lag signal measurements, and obtaining reference measurements in accordance with an embodiment.

FIG. 14 is a summary of the operation of the active pixels and shielded pixels in the image sensor. As shown, during normal operation (e.g., the active pixels), every given frame (N) has a T1 (first integration time) shutter, a T1 integration time, and a T1 readout. Then, there is a T2 (second integration time) shutter, a T2 integration time, and a T2 readout.

To obtain a measurement of the lag signal, a signal charge is injected during the T1 shutter. There is then a T1 equivalent integration time followed by a T1 readout. Then, there is a T2 (second integration time) shutter, a T2 integration time, and a T2 readout, similar to as in the normal operation. This measurement operation allows for the lag caused by the signal charge injected during the T1 shutter to be measured.

If desired, an additional frame (N+1) may be included where the impact of the frame N T1 shutter charge injection (shown in FIG. 14) is measured on the frame N+1 T1 readout and T2 readout. This may be used for correction of transient lag when a frame buffer is included in the sensor.

To obtain a reference measurement for the lag signal, a signal charge is injected just before the T1 readout. Then, there is a T2 (second integration time) shutter, a T2 integration time, and a T2 readout, similar to as in the normal operation. This reference measurement operation allows for a lag-free signal associated with the same magnitude of injected signal charge to be measured.

Figure 15:
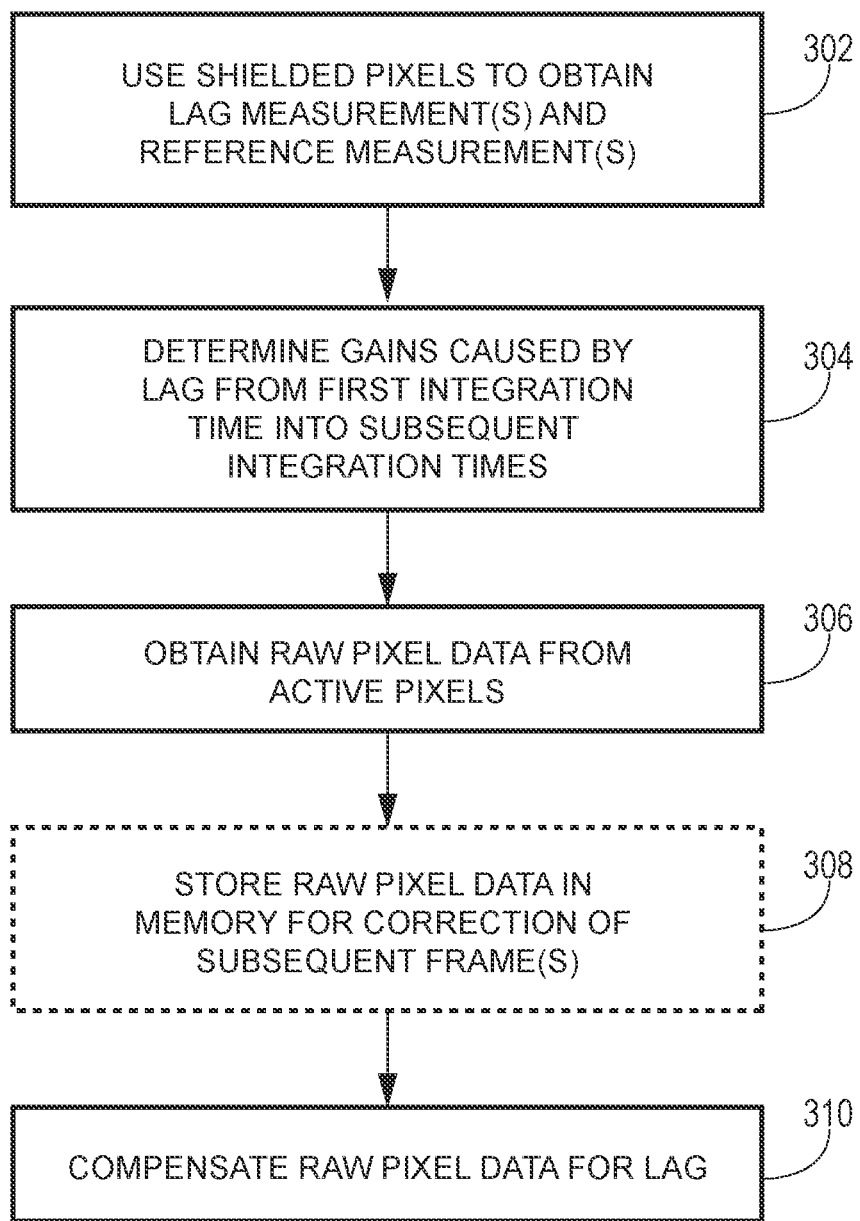
FIG. 15 is a flowchart of illustrative method steps for operating an image sensor with dielectric relaxation compensation circuitry in accordance with an embodiment.

A flowchart showing an illustrative method of operating an image sensor with shielded pixels and dielectric relaxation compensation circuitry is shown in FIG. 15. First, at step 302, the shielded pixels (e.g., pixels 200 in FIG. 10) may be used to obtain one or more lag measurements and one or more reference measurements. The one or more lag measurements may be obtained by injecting a signal onto the capacitor before a first integration time (as shown in FIG. 12). The one or more reference measurements may be obtained by injecting a signal onto the capacitor just before readout (as shown in FIG. 13).

The applied stress signal during the measurements of step 302 may be a fixed charge sampled onto the capacitor, a constant voltage over the capacitor, a variable voltage over the capacitor, or a constant current to the capacitor.

Next, at step 304, a difference between the lag measurements and the reference measurements may be used to quantify the effect of the lag signal from the first integration period on subsequent integration periods. A voltage stress versus lag signal function (e.g., a linear function) may be determined using the measurements obtained from the shielded pixels in step 302.

At step 306, the active imaging pixels of pixel array 32 may be used to obtain pixel data (e.g., frames of pixel data for a given scene). Optionally, the pixel data may be stored in memory (e.g., a frame buffer) at step 308. Including the additional memory allows for more accurate lag signal correction (e.g., transient effects can be accounted for, not only steady state effects).

Finally, at step 310, the dielectric relaxation compensation circuitry 204 may compensate the raw pixel data for lag. There are different options for compensating the raw pixel data for lag. In one example, the individual readouts (e.g., readouts associated with each integration time) may be compensated based on a lag signal identified by the determined lag signal versus voltage stress function (e.g., compensating a given frame using only pixel data from the given frame). In yet another example (e.g., where a frame buffer is included), the T1 signal from a previous image may be used as the basis for the lag signal compensation (e.g., compensating a given frame using pixel data from one or more previous frames).

It should be understood that the examples of pixel structures and timing diagrams shown herein are merely illustrative. In general, the aforementioned techniques of measuring lag signal using shielded pixels, determining a lag signal versus voltage stress relationship, and correcting pixel data for lag signal may be applied to any pixel that has a capacitor and is therefore susceptible to lag signal.

As one example, the source of the reset transistor in FIG. 3 may instead be connected to a different node than FD.

Some imaging pixels may operate with multiple integration times and readouts in a single frame. For example, after a first integration time and corresponding readout, an imaging pixel may have a second, shorter integration time and corresponding readout (similar to as shown in FIGS. 11-13). Having multiple integration times and/or readouts in this way may increase dynamic range in the imaging pixels. In these types of pixels, each readout may have a corresponding lag signal. The techniques described herein may be used to determine the lag signal versus voltage stress relationship for any (or all) of the readouts and correct the pixel data accordingly.

The embodiments for compensating for lag in image sensors may be applied to rolling shutter image sensors or global shutter image sensors and are applicable to both overflow and storage capacitors.

The foregoing is merely illustrative of the principles of this invention and various modifications can be made by those skilled in the art. The foregoing embodiments may be implemented individually or in any combination.

What is claimed is:

1. An image sensor comprising:
an array of imaging pixels that is exposed to incident light;
shielded pixels that are shielded from the incident light, wherein each one of the imaging pixels and shielded pixels includes a capacitor, and wherein the shielded pixels are configured to:
obtain a lag signal measurement by applying a first voltage stress to the capacitor; and
obtain a reference measurement by applying a second voltage stress to the capacitor.

2. The image sensor defined in claim 1, wherein applying the first voltage stress to the capacitor comprises applying the first voltage stress to the capacitor before an integration time.

3. The image sensor defined in claim 2, wherein applying the second voltage stress to the capacitor comprises applying the second voltage stress to the capacitor after the integration time.

4. The image sensor defined in claim 1, further comprising:
circuitry configured to quantify an effect of a lag signal using a difference between the lag signal measurement and the reference measurement.

5. The image sensor defined in claim 1, further comprising:
circuitry configured to determine a difference between the lag signal measurement and the reference measurement.

6. The image sensor defined in claim 1, further comprising:
dielectric relaxation compensation circuitry that is configured to compensate raw pixel data from the array of imaging pixels for lag using the lag signal measurement and the reference measurement.

7. The image sensor defined in claim 1, further comprising:
dielectric relaxation compensation circuitry that is configured to, using the lag signal measurement and the reference measurement, compensate for steady state effects of lag, wherein the dielectric relaxation compensation circuitry does not include a frame buffer.

8. The image sensor defined in claim 1, further comprising:
dielectric relaxation compensation circuitry that is configured to, using the lag signal measurement and the reference measurement, compensate for transient effects of lag, wherein the dielectric relaxation compensation circuitry includes a frame buffer.

9. An image sensor comprising:
an array of imaging pixels that is exposed to incident light, wherein each imaging pixel includes a capacitor;
shielded pixels that are shielded from the incident light and that are configured to generate test signals; and
dielectric relaxation correction circuitry that does not include a frame buffer, wherein the dielectric relaxation correction circuitry is configured to, using the test signals, correct raw pixel data from the imaging pixels for steady state effects of lag caused by dielectric relaxation in the capacitors of the imaging pixels.

10. The image sensor defined in claim 9, wherein the dielectric relaxation correction circuitry is configured to determine a relationship between lag and voltage stress using the test signals.

11. The image sensor defined in claim 9, wherein each one of the shielded pixels has a respective capacitor with a respective bottom plate coupled to a driver.

12. The image sensor defined in claim 9, wherein the array of imaging pixels is operated with a first timing scheme that includes a stress time, a float time, and a reset time and wherein the shielded pixels are operated with a second timing scheme that also includes the stress time, the float time, and the reset time.

13. The image sensor defined in claim 9, wherein the array of imaging pixels is operated with an integration time of a first duration, wherein the shielded pixels generate a test signal while voltage stress is applied to a capacitor in each one of the shielded pixels for a stress time, and wherein the stress time has a second duration.

14. The image sensor defined in claim 13, wherein the second duration is the same as the first duration.

15. The image sensor defined in claim 13, wherein the second duration is within a factor of 3 of the first duration.

16. The image sensor defined in claim 9, wherein each shielded pixel has the same component arrangement as the array of imaging pixels.

17. The image sensor defined in claim 9, wherein correcting the raw pixel data from the imaging pixels for steady state effects of lag comprises assuming that data values for a given frame are the same as data values for a previous frame to the given frame.

18. An image sensor comprising:
an array of imaging pixels that is exposed to incident light, wherein each imaging pixel includes a capacitor;
shielded pixels that are shielded from the incident light and that are configured to generate test signals; and
dielectric relaxation correction circuitry that includes a frame buffer, wherein the dielectric relaxation correction circuitry is configured to, using data from at least one previous frame, correct raw pixel data from the imaging pixels for effects of lag caused by dielectric relaxation in the capacitors of the imaging pixels.

19. The image sensor defined in claim 18, wherein each one of the shielded pixels has the same component arrangement as the array of imaging pixels.

20. The image sensor defined in claim 18, wherein the array of imaging pixels is operated with a first timing scheme that includes a stress time, a float time, and a reset time and wherein the shielded pixels are operated with a second timing scheme that also includes the stress time, the float time, and the reset time.

* * * * *